(12) United States Patent
Kageyama et al.

(10) Patent No.: US 6,594,442 B1
(45) Date of Patent: Jul. 15, 2003

(54) OPTICAL DISK RECORDING STILL IMAGE DATA, A METHOD AND APPARATUS FOR RECORDING AND PLAYING BACK STILL IMAGE DATA TO AND FROM THE OPTICAL DISK

(75) Inventors: Masahiro Kageyama, Hachioji (JP); Akira Date, Kunitachi (JP); Tamotsu Ito, Ayase (JP); Kaoru Murase, Nara-ken (JP); Tomoyuki Okada, Katano (JP)

(73) Assignees: Hitachi, Ltd., Tokyo (JP); Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/332,882

(22) Filed: Jun. 15, 1999

(30) Foreign Application Priority Data

Jun. 17, 1998 (JP) .......................... 10-169491

(51) Int. Cl.$^7$ ............................................. H04N 5/781
(52) U.S. Cl. ........................................ 386/96; 386/126
(58) Field of Search ................ 386/39, 45, 96–107, 386/125–126; 348/512, 515; H04N 5/76, 5/92, 5/781

(56) References Cited

U.S. PATENT DOCUMENTS

| | | | |
|---|---|---|---|
| 5,555,098 A | | 9/1996 | Parulski |
| 5,767,845 A | * | 6/1998 | Oashi et al. ................. 345/302 |
| 6,167,189 A | * | 12/2000 | Taira et al. .................... 386/95 |
| 6,396,997 B2 | * | 5/2002 | Moriyama et al. ........... 386/125 |
| 6,438,315 B1 | * | 8/2002 | Suzuki et al. .................. 386/95 |

FOREIGN PATENT DOCUMENTS

| | | |
|---|---|---|
| EP | 0 295 148 A1 | 12/1988 |
| EP | 0 689 206 A1 | 12/1995 |
| EP | 0 730 272 A2 | 9/1996 |
| EP | 0 753 854 A2 | 1/1997 |

* cited by examiner

Primary Examiner—Thai Tran
(74) Attorney, Agent, or Firm—Antonelli, Terry, Stout, & Kraus, LLP

(57) ABSTRACT

A recording medium and a recording/playback unit which use with the recording medium. The recording medium comprises a still image data area capable of storing a plurality of still image data pieces therein and an area storing still image set management information therein for managing a part or the whole of the still image data in the still image data area as one still image set. Each still image set has the corresponding still image set management information.

14 Claims, 16 Drawing Sheets

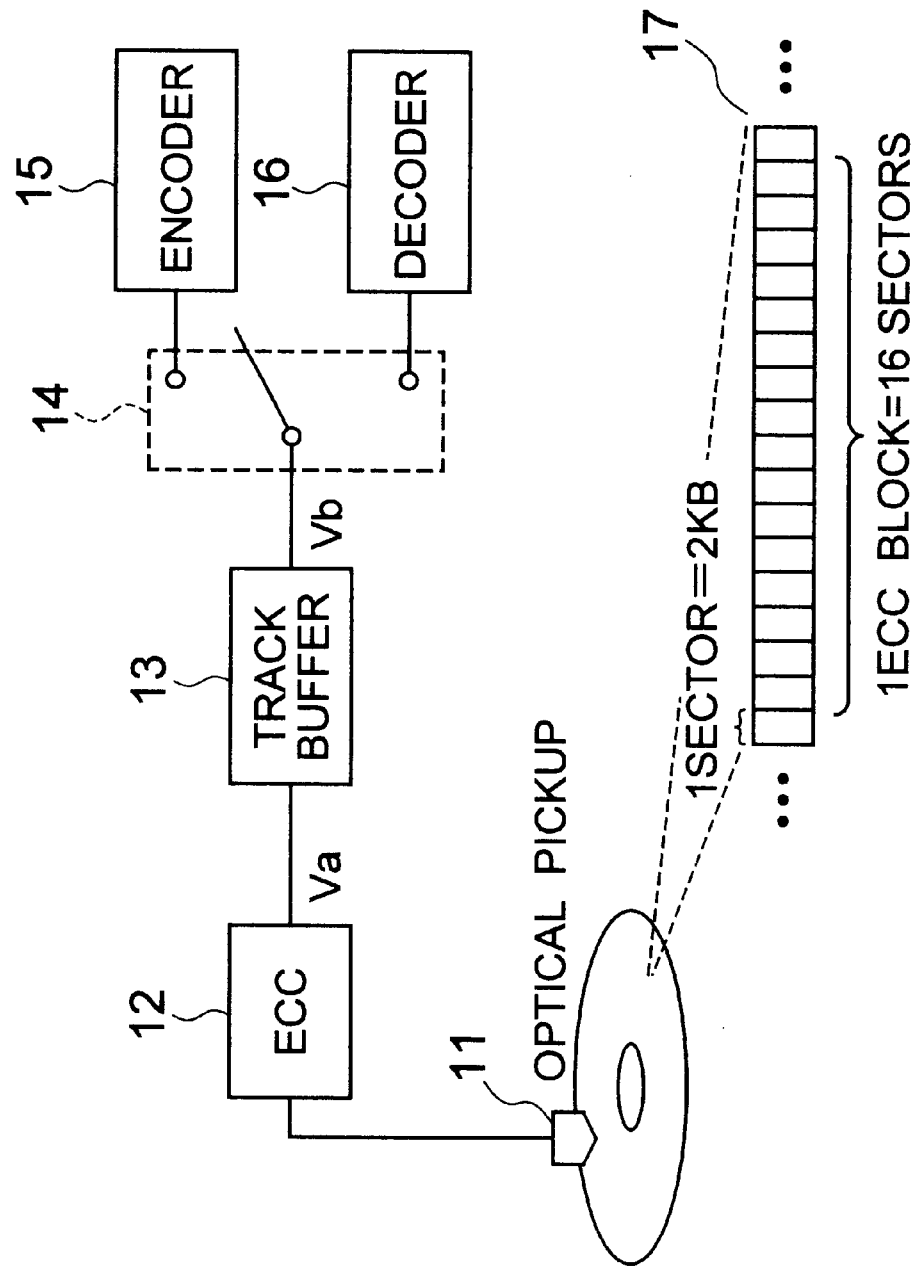

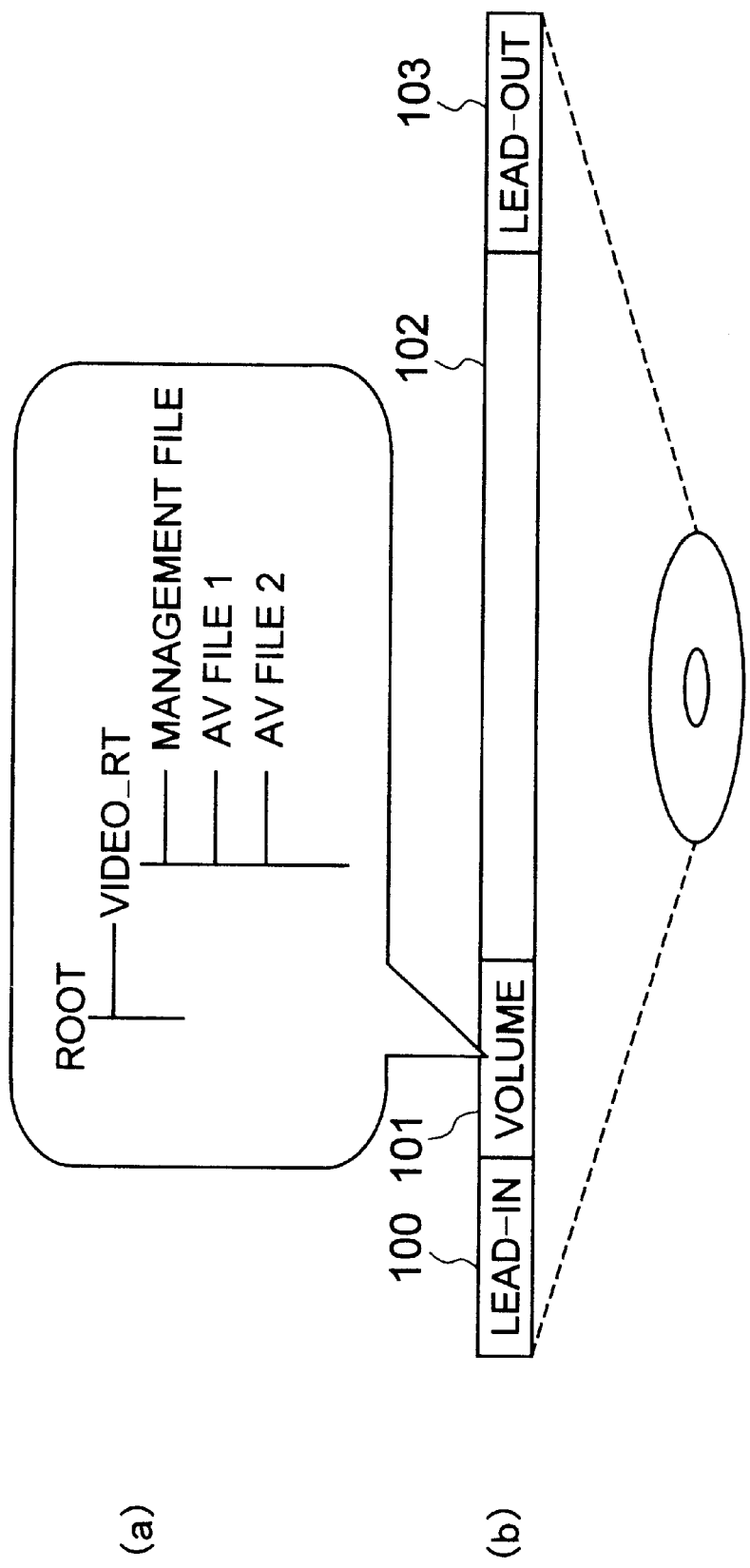

OPTICAL DISK RECORDING STILL IMAGE DATA, A METHOD AND APPARATUS FOR RECORDING AND PLAYING BACK STILL IMAGE DATA TO AND FROM THE OPTICAL DISK

BACKGROUND OF THE INVENTION

The present invention relates to a recording medium to and from which digital data may be written and read, to a recording unit recording digital data on it, and to a playback unit playing back digital data from it. Particularly, the present invention relates to an optical disk on which multimedia data, such as video data, still image data, and audio data, may be recorded and to a recording unit and playback unit.

A phase-change disk DVD-RAM (Digital Versatile Disc-RAM) with a capacity of several GB (Giga Bytes) has been introduced into the field of writable optical disks with a maximum capacity of about 650 MB (Mega Bytes). As MPEG (MPEG2), the standard for coding digital AV (Audio and Video) data, is employed for practical use, DVD-RAM is now expected for use not only on computers but also as recording and playback media in the AV field. That is, it is predicted that DVD-RAMs will become media replacing magnetic tapes which have been used as standard AV recording media.

(Description of DVD-RAM) Recently, as the recording density of a rewritable optical disk increases, not only computer data or audio data but also image data may be recorded on the optical disk. For example, on the signal-recording surface of an optical disk, the guide grooves in the form of projection and ditch have been provided conventionally.

In former days, signals were recorded only in the projection or the ditch positions. The introduction of the land-groove recording method has made it possible for signals be recorded in both the projection and the ditch positions. This method has achieved about twice as high density as before (For example, Japanese Patent Laid-Open Application No. JP-A-8-7282).

The CLV method (Constant Line Velocity) efficiently increases the recording density. A method such as the zone CLV method which makes the CLV method easier to control and implement was also devised and put into practical use (For example, Japanese Patent Laid-Open Application No. JP-A-7-93873).

One of major problems with an optical disk with an ever-increasing capacity is how to record AV data, including image data, and how to implement performance and new functions much higher than those of conventional AV equipment.

With the advent of this large-capacity, rewritable optical disk, it is expected that tapes which have been used in most cases for AV data recording and playback will be replaced by optical disks. A shift in recording media from tapes to disks will have various influences on the function and performance of AV equipment.

One of the most prominent advantages of the shift to disks is a great improvement in the random access performance. An attempt to make a random access to data on a tape involves rewinding one volume of tape which will usually take the order of minutes. This is much larger than the seek time (several ten milli-second or less) of optical disk media. Thus, the tape cannot be used practically as a random access device.

This random access performance of an optical disk makes possible the distributed recording of AV data which would be impossible on conventional tapes.

FIG. 1 is a block diagram showing the drive of a DVD recorder. In the figure, reference numeral 11 is an optical pickup which reads data from the disk, 12 is an ECC (error correcting code) processor, 13 is a track buffer, 14 is a switch switching input/output of the track buffer, 15 is an encoder, 16 is a decoder, and 17 is the enlarged view of a recording area on the disk.

As shown in 17, the minimum unit of data recorded on the DVD-RAM disk is 1 sector=2 KB. The ECC processor 12 performs error correction processing on 16 sectors=1 ECC block.

The track buffer shown by 13 is a buffer used to record AV data at variable bit rates to efficiently record AV data on the DVD-RAM disk. This buffer acts as a buffer to resolve the difference between the DVD-RAM read/write rate (Va in the figure) which is constant the and the AV data bit rate (Vb in the figure) which varies according to the complexity of the contents (such as image data of video).

More efficient use of this track buffer 13 allows AV data to be distributed on the disk. This is described below using FIGS. 2A and 2B.

FIG. 2A is a diagram showing the address space of the disk. As shown in FIG. 2A, when AV data is recorded in separate contiguous areas [a1, a2] and [a3, a4], supplying data, stored in the track buffer, to the decoder during the seek operation from a2 to a3 allows AV data to be played back continuously. FIG. 2B shows how data is accumulated into, and supplied from, the track buffer.

AV data, which is read starting from a1, is input into, and output to, the track buffer beginning at time t1. The amount of data corresponding to the difference in rate (Va−Vb) between the track buffer input rate (Va) and the track buffer output rate (Vb) is accumulated in the track buffer. This condition continues until data at a2 is read (time t2). The amount of data B(t2), accumulated up to this time, is used as data that is supplied to the decoder until time t3 at which reading starts at a3 arrives.

In other words, if the amount of data ([a1, a2]) accumulated before the seek operation is equal to or larger than a sufficient amount, AV data may be supplied continuously even if the seek operation happens.

In the above example, data is read, or played back, from a DVD-RAM. The example also applies when data is written, or recorded, onto the DVD-RAM.

As described above, if the data exceeding a sufficient amount is contiguously recorded on the DVD-RAM, continuous playback/recording is possible even if AV data is distributed on the disk.

(Description of MPEG)

Next, AV data is described.

As described above, AV data recorded on a DVD-RAM uses the international standard called MPEG (ISO/IEC13818).

A DVD-RAM, with a large capacity of several GB, is not large enough to store non-compressed digital AV data. This means that AV data must be compressed before being recorded. One of the popular methods for compressing AV data is MPEG (ISO/IEC13818). A recent advance in the LSI technology makes it possible to implement an MPEG codec (compression/decompression LSI chip), allowing the DVD recorder to MPEG-compress/decompress data.

For highly efficient data compression, MPEG has the following two major characteristics:

The first characteristic is that, in addition to the conventional compression method using the spatial frequency characteristics, MPEG uses a compression method using inter-frame time correlation characteristics for compressing video data. To compress data, MPEG classifies frames (also called pictures in MPEG) into three: I picture (intra-frame coded picture), P picture (picture using intra-frame coding and a reference to the preceding picture), and B picture (picture using intra-frame coding and a reference to the preceding and following pictures).

FIG. 3 shows the relation among I, P, and B pictures. As shown in FIG. 3, the P picture refers to the immediately preceding I or P picture, while the B picture refers to the immediately preceding and following I or P picture. Also, because the B picture refers to the following I or P picture, the display order of pictures does not always match that (coding order) of compressed data as shown in FIG. 3.

The second characteristic is that MPEG allocates an amount of coding dynamically to each picture depending upon the complexity of the image. The MPEG decoder has an input buffer and accumulates data in this decoder buffer, making it possible to allocate a large amount of code to a complex image which is difficult to compress.

Audio data used on a DVD-RAM may be selected from the following three: MPEG audio data and Dolby digital data (AC-3) which are compressed and LPCM data which is not compressed. The bit rate of Dolby digital data and LPCM data is fixed. The size of MPEG audio data may be selected from several sizes in units of audio frames which are not so large as video streams.

This AV data is multiplexed into one stream using a method called a MPEG system. FIG. 4 is a diagram showing the configuration of the MPEG system. The reference numeral 41 is a pack header, 42 is a packet header, and 43 is a payload. The MPEG system has a hierarchical structure consisting of packs and packets. A packet is composed of the packet header 42 and the payload 43. AV data, divided into several pieces each in an appropriate size, is stored in the payload 43 beginning at its head. The packet header 42 contains information on the AV data stored in the payload 43; it contains the ID (stream ID) identifying the stored data as well as the decoding time DTS (Decoding Time Stamp) with precision in 90 kHz and display time PTS (Presentation Time Stamp) of the data included in the payload (For data such as audio data which is decoded and displayed almost at the same time, the DTS is omitted). A pack is a unit composed of a plurality of packets. Since one pack is used for one packet for DVD-RAM, a pack is composed of the pack header 41 and a packet (packet header 42 and payload 43). In the pack header is recorded the SCR (System Clock Reference) which is the 27 MHz-precision time at which data in the pack is input into the decoder buffer.

A MPEG system stream like this is recorded on the DVD-RAM, one pack per one sector (=2048 bytes).

Next, the decoder decoding the above-described MPEG system stream is described. FIG. 5 shows the decoder model (P-STD) of the MPEG system decoder. The reference numeral 51 is an STC (System Time Clock) measuring the standard time used in the decoder, 52 is a de-multiplexer which decodes, or de-multiplexes, a system stream, 53 is an input buffer of the video decoder, 54 is a video decoder, 55 is a re-order buffer in which I and P pictures are stored temporarily to adjust the difference between the data order and the display order of I pictures and P pictures described above, 56 is a switch adjusting the output order of the I pictures and P pictures stored in the re-order buffer, 57 is an input buffer of the audio decoder, and 58 is an audio decoder.

The system decoder having this configuration processes the above-described MPEG system stream as described below. When the time of the STC 51 matches the SCR described in the pack header, the de-multiplexer 52 receives the pack. The de-multiplexer 52 interprets the stream ID contained in the packet header and transfers the streams of data in the payload to the decoder buffer 53 or 57 for each stream. The de-multiplexer 52 also gets the PTS and DTS from the packet header. When the time of the STC 51 matches the DTS, the video decoder 54 gets picture data from the video buffer 53, decodes it, stores the I and P pictures in the re-order buffer 55, and displays the B pictures. When the picture the video decoder 54 decodes is an I or P picture, the switch 56 is switched to the output terminal of the re-order buffer 55 to output the preceding I or P picture from the re-order buffer 55; when the picture the video decoder 54 decodes is a B picture, the switch 56 is switched to the output terminal of the video decoder 54. Like the video decoder 54, when the time of the STC 51 matches the PTS (there is no DTS for audio data), the audio decoder 58 gets one frame of audio data from the input buffer 57 and decodes it.

Next, the multiplexing method of an MPEG stream is described with reference to FIG. 6. FIG. 6(a) shows video frames, FIG. 6(b) shows the video buffer, FIG. 6(c) shows an MPEG system stream, and FIG. 6(d) shows audio data. The horizontal axis, common to all figures, is the time axis. Data in each figure is drawn based on this time axis. In the figure showing the video buffer status, the vertical axis indicates the buffer occupancy (amount of data accumulated in the video buffer) with the bold line indicating the chronological change in the buffer occupancy. The slope of the bold line corresponds to the bit rate, indicating that data is input into the buffer at a constant rate. A reduction in the buffer occupancy at a regular interval indicates that data is decoded at that time. The intersection of the dotted diagonal line and the time axis indicates the time at which the transfer of video frames to the video buffer is started.

The following describes the operation with complex video data image A as an example. As shown in FIG. 6(b), the data of image A must be transferred to the video buffer at time t1 that is earlier than the decode time (The time from the data input time t1 to the decode time is called vbv_delay) because image A requires a large amount of code. As a result, the AV data is multiplexed in the position of the video pack indicated by the shaded area in FIG. 6(c). On the other hand, audio data, which does not require dynamic coding amount control as with video data, need not be transferred earlier than the decode time; in most cases, audio data is multiplexed some time earlier than the decode time. Therefore, for video data and audio data that are played back at the same time, the video data is multiplexed before the audio data. It should be noted that, for MPEG, all data except still-image data must be output from the buffer to the decoder within one second. This means that the maximum difference in the multiplexing time between video data and that of audio data is one second (Strictly speaking, the time needed for re-ordering video data may be added to the maximum time).

In this example, although video data is multiplexed before audio data, audio data may be multiplexed before video data theoretically. When highly-compressed, easy-to-process video data is prepared and the audio data is transferred much earlier, it is possible to create such data. However, because of the limitation of MPEG described above, audio data may be transferred not earlier than one second.

(Description of Digital Still Camera)

Next, a digital still camera is described.

Recently, digital still cameras using JPEG (ISO/IEC 10918-1) have become popular. The popularity of digital still cameras is due to the fact that personal computers have rapidly come into wide use recently. Images taken by digital still cameras may be easily captured into personal computers via semiconductor memory, floppy disks, infrared light communication, and so forth. The still images captured into personal computers may be used in presentation software products, word processors, and internet contents.

In addition, digital still cameras capable of capturing sounds have become used. The capability of recording sounds has given digital still cameras another advantage over conventional film cameras.

FIG. 7 shows the relation between JPEG data recorded by a digital still camera and the directories and files on a PC (personal computer).

As shown in FIG. 7, JPEG data is recorded in one file (with the extension code of "JPG"). When the number of files exceeds a predetermined number and it becomes difficult for the user to manage the files, they are usually organized into the directory structure, each directory including about 100 files as shown in FIG. 7.

However, the number of still images that can be recorded by a digital still camera is limited by the recording capacity of the recording media such as flash memory or floppy disks. A large number of still images cannot be recorded. For example, when still images, each 50 KB in size, are recorded in the 100 MB flash memory, the maximum number of still images that may be recorded at a time is as small as about 2,000 still pictures.

(Description of Digital VCR)

Next, a digital VCR, in particular, a DVC which has rapidly become popular recently, is described.

The introduction of the DVC has implemented new functions not provided on the conventional VCR. One of them is a recording in which video and still images are mixed.

FIG. 8 is a diagram showing how the DVC records video and still images.

As shown in FIG. 8, the DVC allows video and still images to be mixed in a sequential order on tape, allows video and still images to be alternately recorded, or allows still images to be recorded continuously just as they would on an album.

However, the DVC, which is a tape medium, lacks random accessibility. In addition, it has no management information similar to that used on the computer, making it difficult for the user to play back a particular still image the user wishes.

The introduction of the DVD-RAM means a potential new AV equipment which solves the problem of limited number of still images of digital cameras and the problem of random accessibility of the DVC and which enables the user to process tens of thousands of still images freely.

SUMMARY OF THE INVENTION

As described above, the DVD-RAM is expected as one of the next-generation AV recording media. The present invention solves the following problems which prevent the performance of the DVD-RAM from being maximized. The present invention also enables a DVD recorder to be implemented. The DVD recorder is thought of as the intended and most important application of the rewritable large-capacity optical disk DVD-RAM.

The most serious problem of processing a large amount of still image data on the DVD recorder is that the amount of management information is extremely large.

The still image data management information is described with reference to FIG. 9.

Access to still image data recorded on the disk requires information such as the address and the size of data the user is going to access.

In addition, the addition of sound data as on a digital still camera requires information not only on the address and the size but also on the playback time of the sound data. Post-recording, which is recorded separately after still image data is recorded, also requires post-recording audio data management information.

Access to the 4.7 GB data area, one sector at a time (1 sector=2048 bytes), requires 4 bytes for the address, 1 byte for still image data, and 2 bytes for sound data; in addition, for sound data, another 2 bytes is required for the playback time. The post-recording of sounds requires twice as large management information, with the total management information area being 21 bytes in size.

If 65000 still images are recorded and 21 bytes of management information is used for each still image, the size of the management information is calculated as:

$$65000 \times 21 \text{ bytes} = 1365000 \text{ bytes}$$

The total of about 1.4 MB of management information is required.

Although 1.4 MB of data is small as compared with the DVD recording capacity, the system controller (corresponds to the CPU of a PC) must always have this data in memory for use in random access. Despite a significant drop in the price of memory, it is unusual for AV equipment to have memory larger than one MB. And, it is impractical for AV equipment to have a battery backup for backing up the memory, larger than one MB, against an emergency.

The present invention provides a recording medium which minimizes the storage area for data management information to allow the recording area to be used efficiently, a recording unit which records data on the recording medium, and a playback unit which plays back data from the recording medium. The recording medium according to the present invention comprises a still data image area (102) in which a plurality of still image data (VOB) pieces may be recorded and an area (102) in which still image set management information (VOBSI), managing the still image data (VOB) in a part and the whole of the still image data area as a gathering still image set (VOBS), is recorded. The still image set (VOBS) has corresponding still image set management information (VOBSI).

BRIEF DESCRIPTION OF THE DRAWINGS

FIG. 1 is a block diagram of a DVD recorder drive unit.

FIG. 10 is a diagram showing the directory structure and the physical arrangement on a disk.

DETAILED DESCRIPTION OF THE EMBODIMENTS

The present invention will be described more in detail using a DVD recorder and a DVD-RAM which are one embodiment of the present invention. In the description of the embodiment, the term "player" sometimes includes the function of a player as well.

(Logical Configuration of a DVD-RAM) First, the logical configuration of a DVD-RAM will be described with reference to FIG. 10. FIG. 10(a) shows the configuration of data on the disk viewed from the file system, and FIG. 10(b) shows the physical sector address on the disk. The physical sector address begins with the lead-in area 100 where reference signals or other media identification signals necessary to stabilize the servo are recorded. The lead-in area 100 is followed by the data areas 101 and 102. In this data area is written logically effective data such as video data, still image data, and audio data. The logical sector address is ended by the lead-out area 103 where reference signals and so on are recorded as in the lead-in area.

The data area begins with volume information area 101 which is management information for use by the file system.

Data on the disk may be treated as directories or files via the file system as shown in FIG. 10(a).

All data processed by the DVD recorder is placed under the VIDEO_RT directory which is immediately under the ROOT directory.

The files processed by the DVD recorder are classified roughly into two: one management file and a plurality of (at least one) AV files.

(Management File)

Figure 11A:
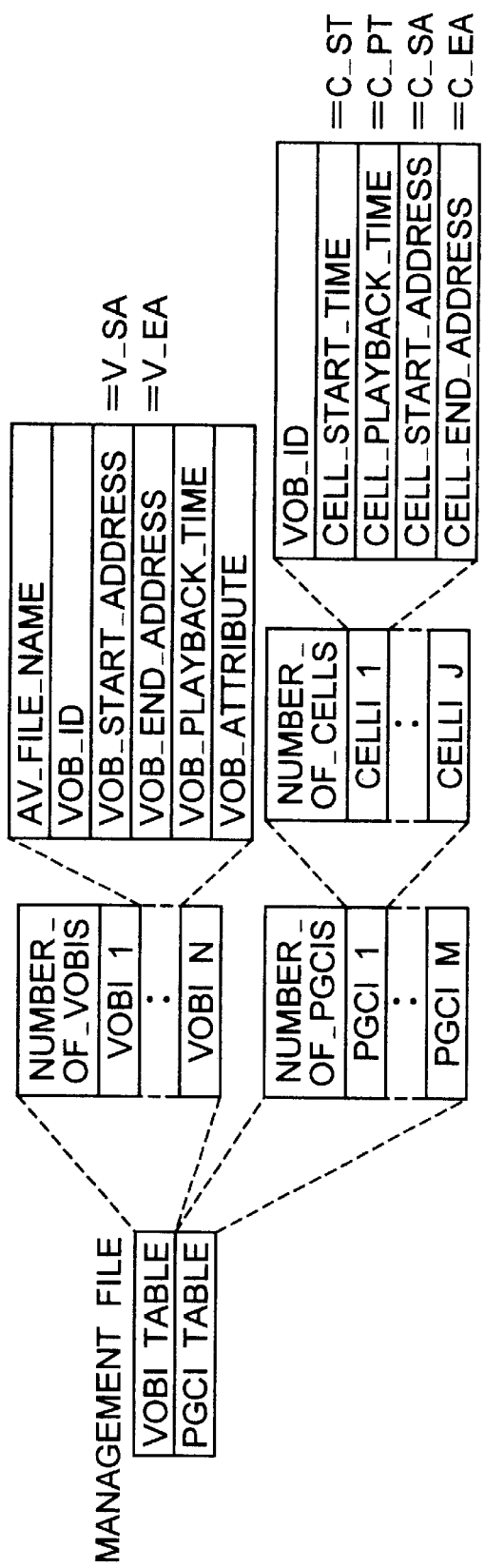
FIG. 11A is a diagram showing management information data.

Next, referring to FIG. 11A, the contents of the management information file are described with emphasis on the management information on video.

The management information file is classified roughly into the VOBI (VOB information) table and the PGCI (PGC information) table. A VOB is an MPEG program stream, while a PGC defines the playback order of cells in a logical playback unit in a sub-range (or whole range) of a VOB. In other words, the VOB is meaningful for MPEG, while the PGC is a unit the player plays back.

The VOBI table consists of the number of VOBIs (Number_of_VOBIs) and a plurality of VOBIs. Each VOBI consists of the corresponding AV file name (AV_File_Name), VOB identifier on the disk (VOB_ID), start address in the AV file (VOB_Start_Address), end address in the AV file (VOB_End_Address), VOB playback time length (VOB_Playback_Time), and stream attribute information (VOB_Attribute).

The PGCI table consists of the number of PGCIs (Number_of_PCGIs) and a plurality of PGCIs. Each PGI consists of the number of cellI (Cell information) entries and the cellIs. Each cellI consists of the playback start time in the VOB (Cell_Start_Time), playback time in the VOB (Cell_Playback_Time), playback start address in the VOB (Cell_Start_Address), and playback end address in the VOB (Cell_End_Address).

(AV File)

Figure 11B:
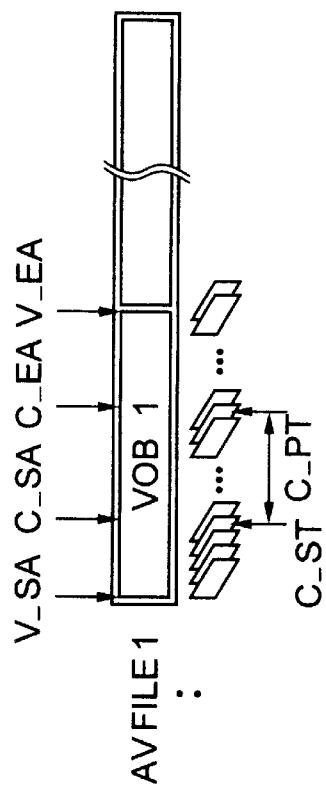
FIG. 11B is a diagram showing stream data.

Next, an AV file is described by referring to FIG. 11B.

An AV file consists of a plurality of VOBs, which are recorded in the Av file consecutively. It should be noted that the AV file sometimes consists of only one VOB. The VOBs in the AV file are managed by the VOB information in the above-described management file. The player first accesses the management information file, reads the VOB start address and end address, and then accesses the VOB. Within the VOB are defined cells which are logical playback units. A cell is a partial playback range (or whole range). This cell allows the user to perform simple editing without having to operate on actual AV data. As with access information on a VOB, access information on a cell is maintained in the management information file. The player first accesses the management information file, reads the cell start address and the end address, and then accesses the cell.

Cell address information is relative to the start of the VOB, and VOB address is relative to the start of the AV file; therefore, the VOB address is added to the cell address to calculate the address in the AV file before the player accesses the AV file.

(Still Image Data Management Information)

Figure 12:
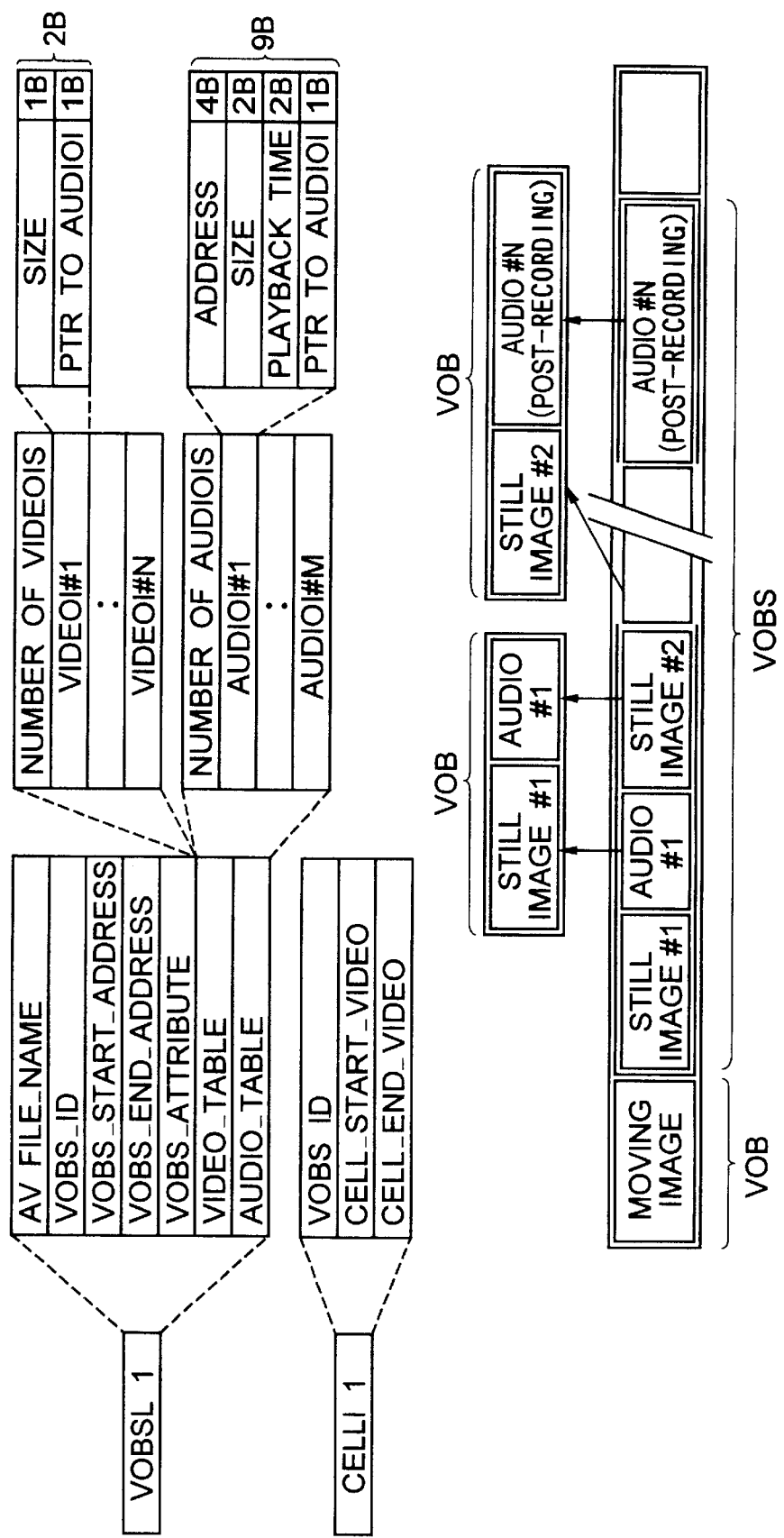
FIG. 12 is a diagram showing the configuration of still image set management information.

Next, by referring to FIG. 12, still image data management information is described.

For still image management information, VOBSIs (VOBS information), instead of VOBIs, are stored in the VOBI table. Each VOBS is a set of a plurality of VOBs, each consisting of a still image and audio data synchronizing the still image if any.

A VOBSI consists of the corresponding AV file name (AV_File_Name), VOBS identifier for identifying a particular VOBS among a plurality of VOBSs on the disk (VOBS_ID), start address in the AV file (VOBS_Start_Address), end address in the AV file (VOBS_End_Address), still image management table (Video_Table) containing management information on the still image data in the VOBS, and audio management information table (Audio_Table) containing management information on the audio data in the VOBS.

The still image management information table (Video_Table) consists of at least one entry of still image management information (VideoI), one for each still image, and information on the number of still image management information entries (Number_of_VideoIs). The still image management information (VideoI) consists of one byte of still image data size information (Size) and one byte of pointer information (Ptr_to_AudioI) pointing to the audio management information in the audio management table (Audio_Table) for the audio information to be played back with the still image.

The audio management information table (Audio_Table) contains audio management information (AudioI) on each piece of audio data and the number of audio management information entries (Number_of_AudioIs). The audio management information (AudioI) contains 4 bytes of audio data address information (Address), 2 bytes of audio data size information (Size), 2 bytes of audio playback time information (Playback_Time), and 1 byte of pointer information (Ptr_to_AudioI) pointing to the audio information (AudioI) within the audio management information table (Audio_Table) where post-recording audio data is stored for use as post-recording audio information when post-recording is used.

The PGCI table which defines the playback sequence contains information different from that of video on a cellI level. A still image set cellI consists of the identifier (VOBS_ID) of the corresponding VOBS, start VOB number in the VOBS (Cell_Start_Video), and end VOB number in the VOBS (Cell_End_Video).

This configuration allows the cells of a still image set in a range (from any still image to any still image) of the VOBS to be played back.

Figure 13:
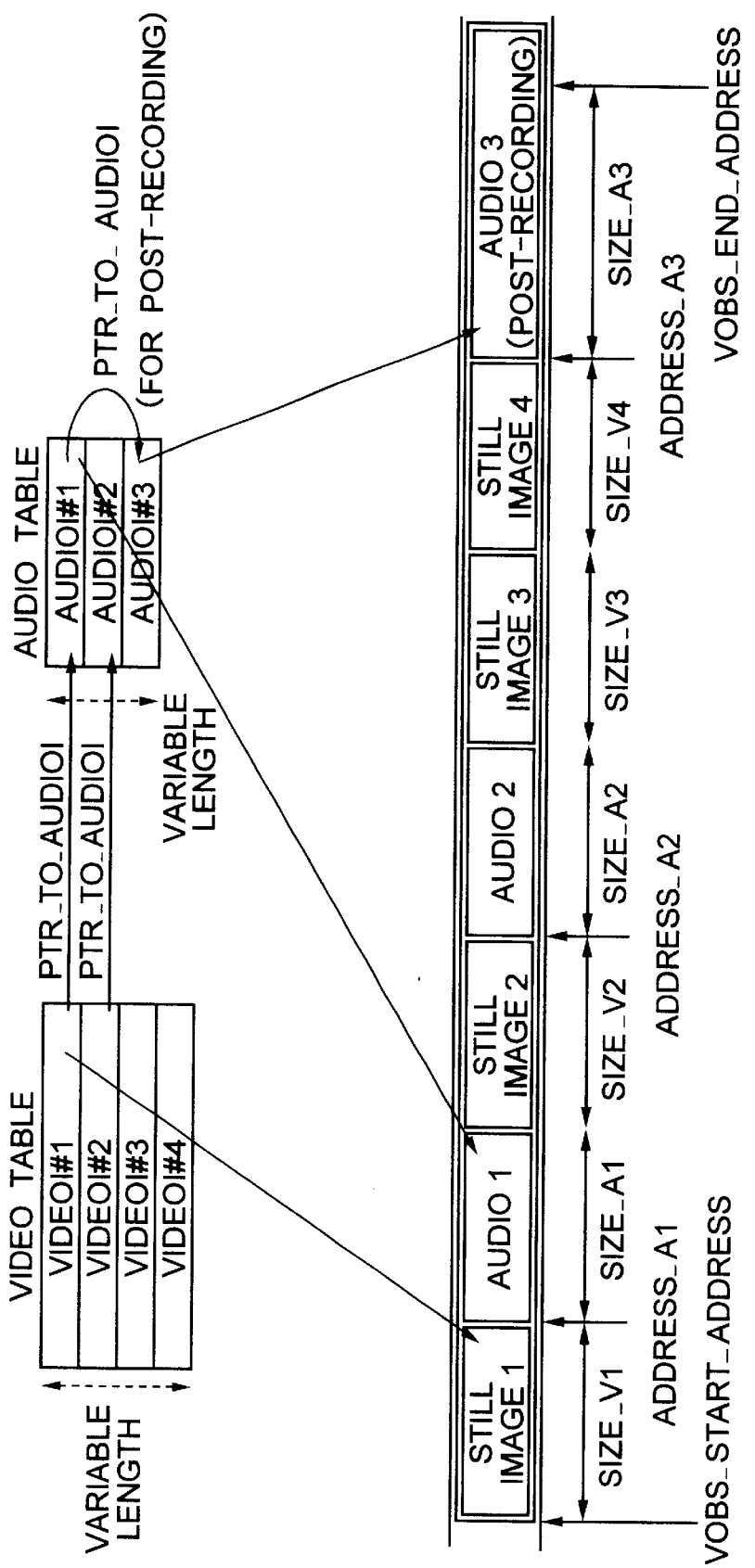
FIG. 13 is a diagram showing a link relation between still images and audio data.

Next, referring to FIG. 13, the link between still images and audio data is described.

The still image management information (VideoI) has pointer information (Ptr_to_AudioI) pointing to the audio management information (AudioI) in the audio table (Audio_Table). An insignificant value (=0) in this field indicates that the still image has no synchronizing audio data to be played back (Video#3 and Video#4). Conversely, a significant value, if included in the pointer information (Ptr_to_AudioI), indicates that the still image has synchronizing audio data to be played back (Video#1 and Video#2).

When post-recording data is added and new audio data is recorded, pointer information (Ptr_to_AudioI) pointing to some other audio management information (AudioI) is created in the audio management information (AudioI). As with the pointer information (Ptr_to_AudioI) in the still image management information (VideoI) described above, a significant value in the pointer information (Ptr_to_AudioI) in the audio management information (AudioI) indicates that there is post-recording audio data (Audio#1->Audio#3).

Next, the relation between still image management information (VideoI)/audio management information (AudioI) and actual data (AV data) in an AV file is described.

The order of still image management information (VideoI) in the still image management information table (Video_Table) matches the order in which still image data was recorded in the AV file. Also, the order of audio management information (AudioI) in the audio management information table (Audio_Table) matches the order in which audio data was recorded in the AV file.

Therefore, for a VOBS consisting only of still image data with no audio data, the address of a still image may be calculated simply by adding the still image data sizes (Size) recorded in the still image management information (VideoI) beginning at the start of the VOBS.

When audio data is enclosed by still images (audio 1 and audio 2), the address generated by adding the still image data sizes is compared with the address in the audio management information (AudioI). If they match, it is found that the audio data is recorded at this address and therefore the data size of the audio data is added to the address. By repeating this calculation, all still image data in the VOBS may be accessed.

Figure 14:
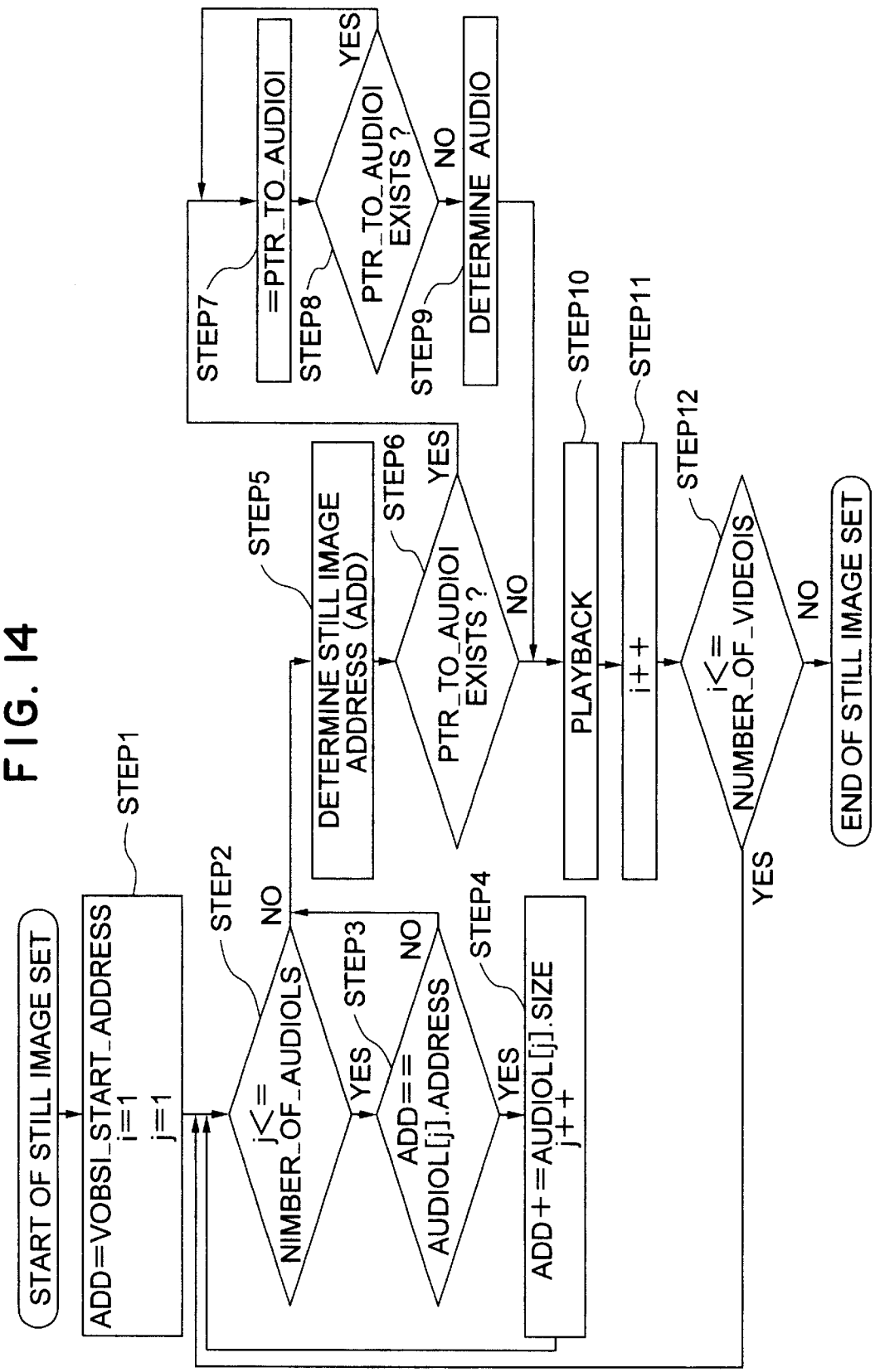
FIG. 14 is a flowchart showing how to determine a still image address and how to check whether or not audio data is present.

Next, referring to the flowchart in FIG. 14, access to still images and audio data, recorded on the optical disk used in the embodiment of the present invention, is described more in detail.

First, Add indicating the current address, the variable i indicating an entry number in the still image management information table (Video_Table), and the variable j indicating an entry number in the audio management information table (Audio_Table) are initialized.

Add=VOB_Start_Address
i=1
j=1
(Step 1)

The variable j and the number of audio management information entries (Number_of_AudioIs) are compared and if j<=Number_of_AudioIs is satisfied, control is passed to step 3 where the audio data and the address are compared. Otherwise, control is passed to step 5.
(Step 2)

The current address Add and the address information in audio management information #j are compared and if Add==Audio[j].Address is satisfied, the current address Add is the start address of the audio data managed by audio management information #j (Audio #j) and therefore control is passed to step 4 where the current address is added. If the above expression is not satisfied, control is passed to step 5.
(Step 3)

The audio data size in audio management information #j (AudioI #j) is added to the current address Add, the variable j is incremented, and control is passed back to step 2.

Add+=Audio[j].Size
j++
(Step 4)

If the conditional expression in step 2 or step 4 is not satisfied, it means that the current address Add is a still image data address and therefore the still image address is determined.
(Step 5)

Next, a check is made to see if there is a pointer to audio management information (AudioI). If there is a pointer, control is passed to step 7 to search for audio data synchronizing with the still image to be played back with the still image. If there is not such a pointer, control is passed to step 10 to play back the still image.
(Step 6)

The audio data to be played back in synchronization with the still image is assigned temporarily to Ptr_to_AudioI.
(Step 7)

A search is made to see if the audio management information (AudioI) pointed to PTR_to_AudioI points to another audio management information (AudioI) entry. If there is a link to another audio management information (AudioI) entry, control is passed back to step 7.
(Step 8)

When it is found in step 8 that there is no more link to another audio management information (AudioI) entry, the audio data to be played back in synchronization with the still image is determined.

(Step 9)

The still image data determined in step 5 and the audio data determined in step 9, if found, are played back.

(Step 10)

The variable i is incremented.

i++

(Step 11)

The variable i is compared with the number of still image management information entries (Number_of_VideoIs) and if i<=Number_of_VideoIs is satisfied, it indicates that there is still another piece of still image data to be played back in the still image set (VOBS). Control is passed back to step 2. If the above expression is not satisfied, the playback of the VOBS ends.

(Step 12)

(VOBSI Data Size)

Next, the management information size for the still image set used in the embodiment is described.

As shown in FIG. 12, management information on one still image requires 2 bytes, one byte for the still image size and one byte for the pointer to audio data. Thus, even if 65,000 still images are taken, the size is 65,000×2 bytes=130,000 bytes That is, the size is about 130 KB. As compared with 1.4 MB described in the prior art, this size is as small as 10% of 1.4 MB.

When audio data is recorded at the same time, adding audio data to all 65,000 still images is unrealistic in terms of capacity even on the DVD-RAM which is a large-capacity recording medium.

If the size of one still image is 50 KB, then 4.7 GB−65,000×50 KB=1.45 GB

If each audio data piece is 192 kbps and 10 seconds, then 1.45 GB/192 kbps×10 sec=6,041

This means that as many as about 6,000 audio data pieces may be recorded. Because each audio data management information entry requires 9 bytes, the total is calculated as:

6,000×9 bytes=54,000 bytes

The total is 184 KB, which is about 13% of the conventional management information.

Figure 2A:
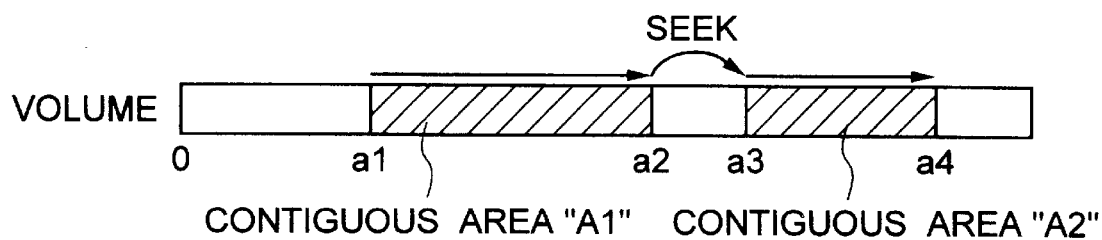
FIG. 2A is a diagram showing the address space on a disk.
Figure 2B:
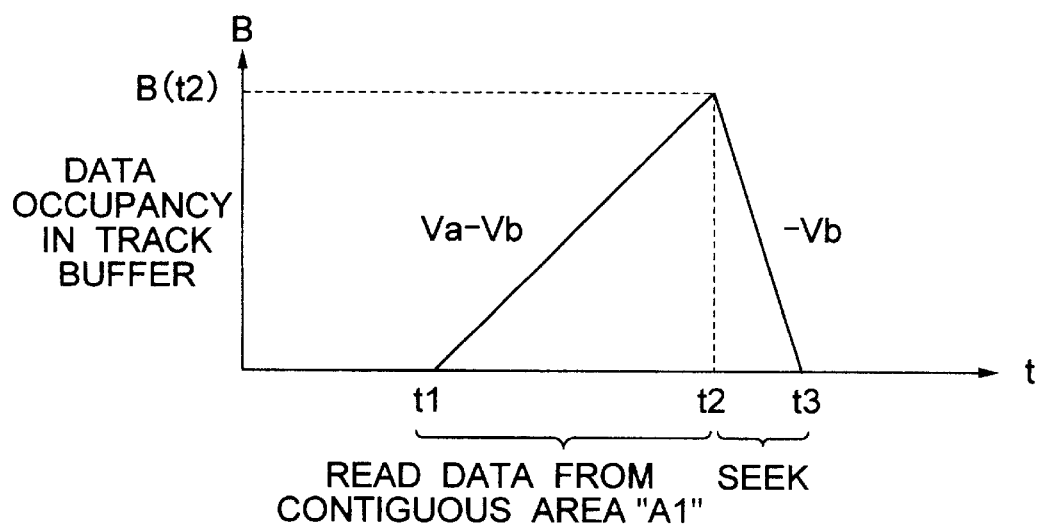
FIG. 2B is a diagram showing the accumulation amount of data in the track buffer.
Figure 3:
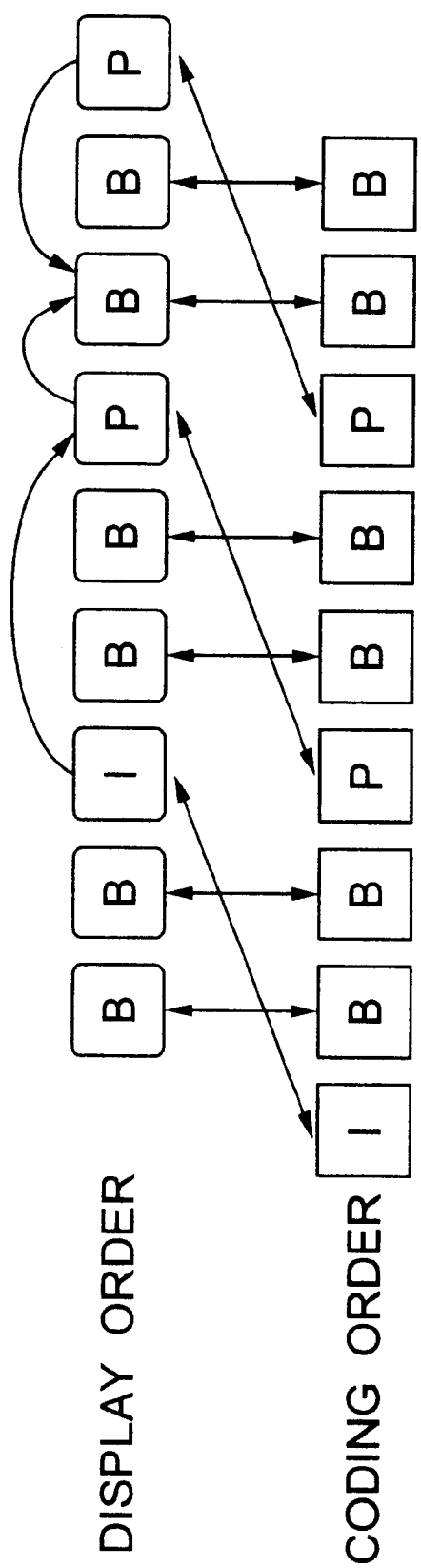
FIG. 3 is a diagram showing the relation of pictures in an MPEG video data stream.
Figure 4:
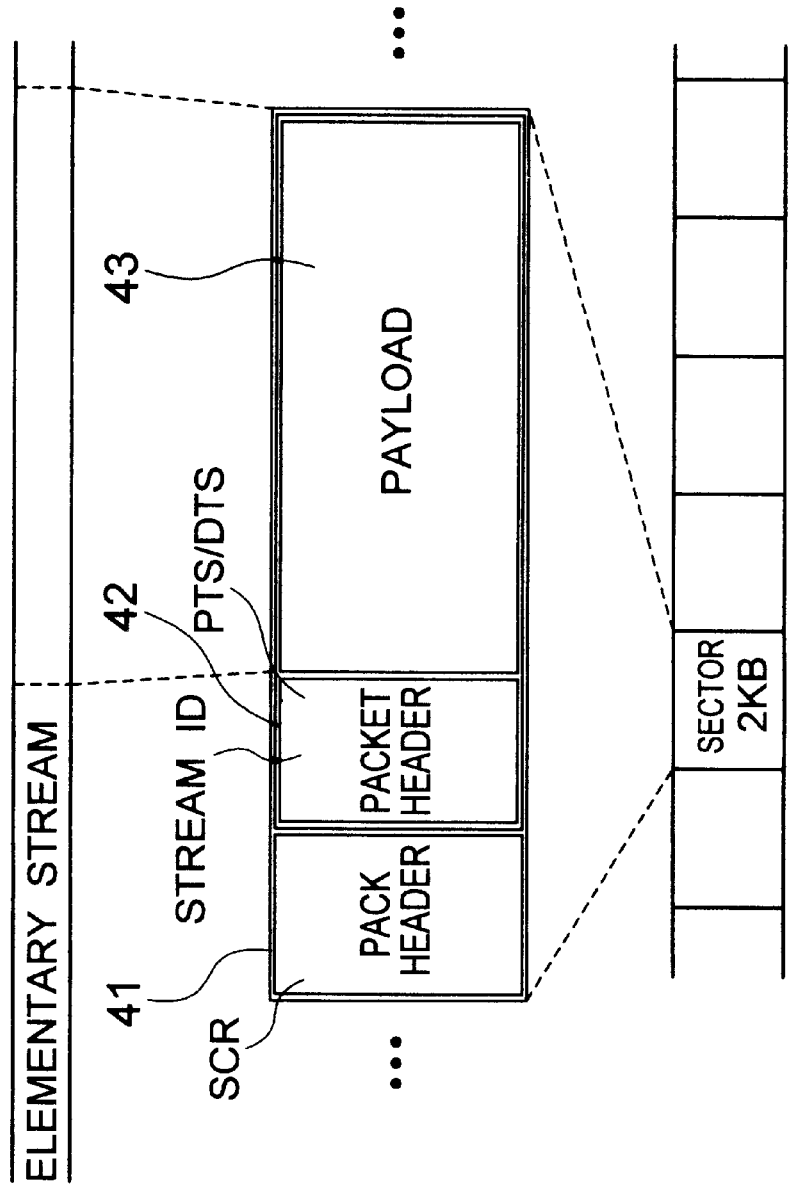
FIG. 4 is a diagram showing the configuration of the MPEG system stream.
Figure 5:
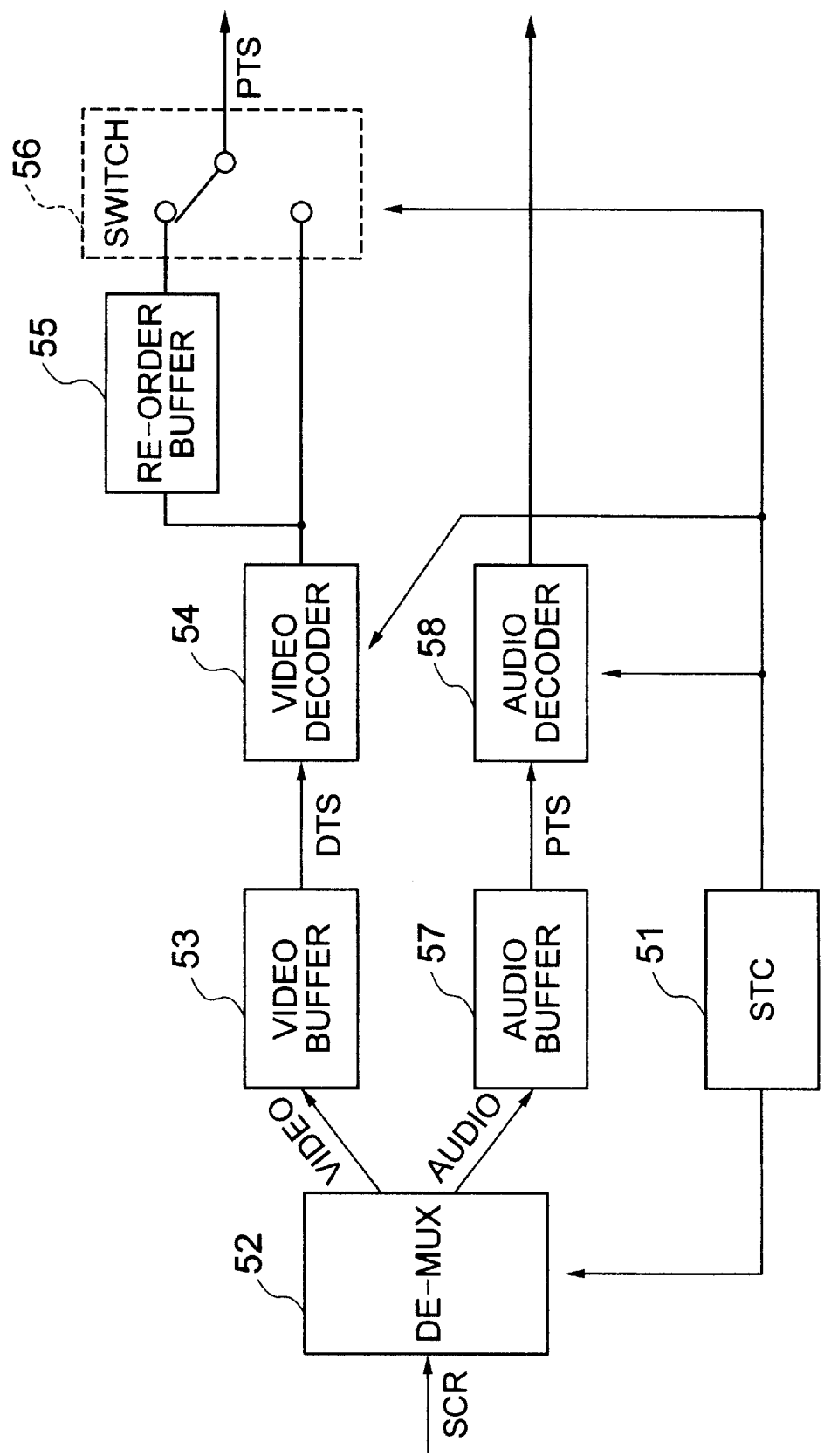
FIG. 5 is a block diagram of an MPEG system decoder (P-STD).
Figure 6:
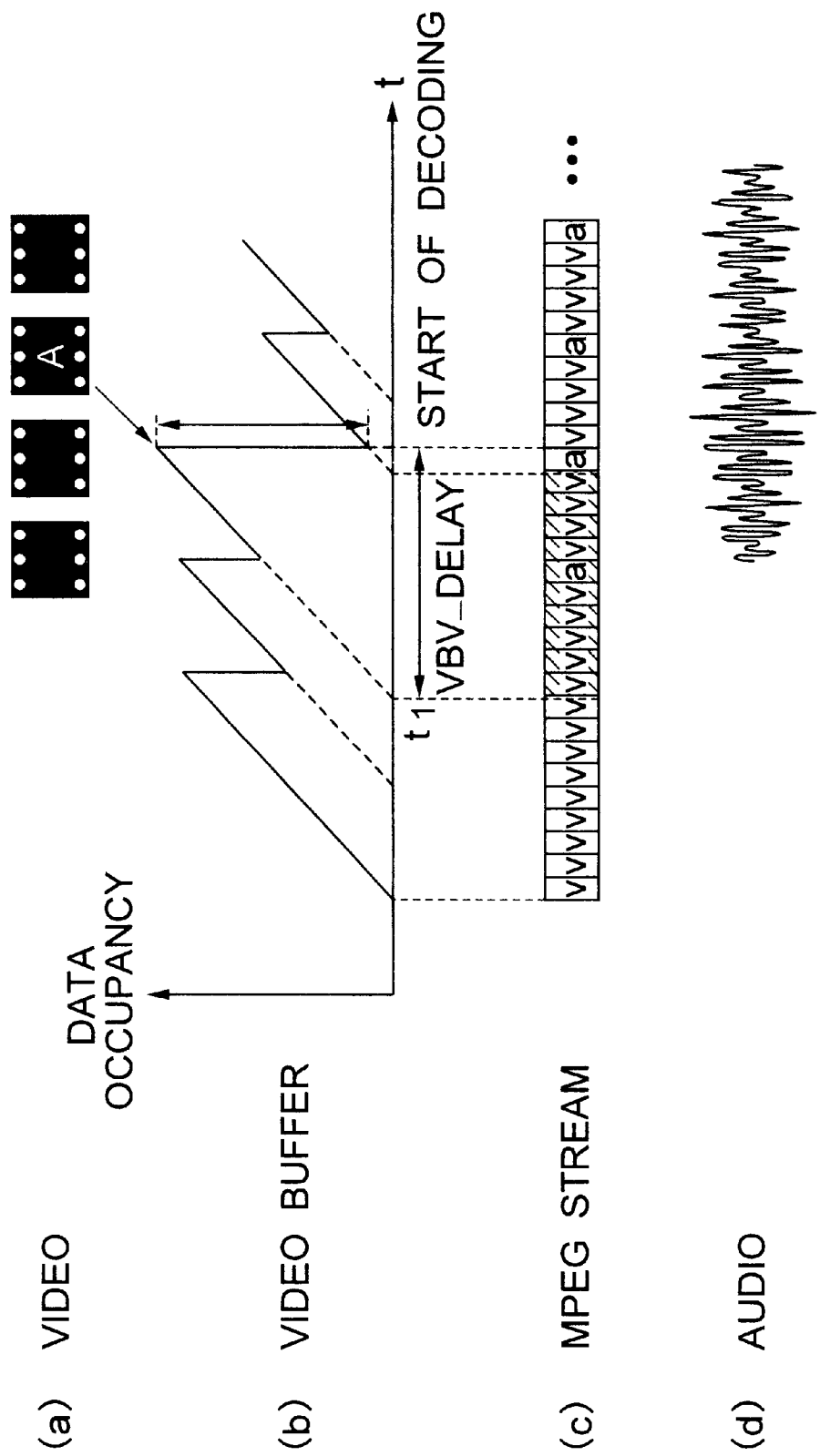
FIG. 6 is a diagram showing video data, a video buffer, an MPEG system stream, and audio data.
Figure 7:
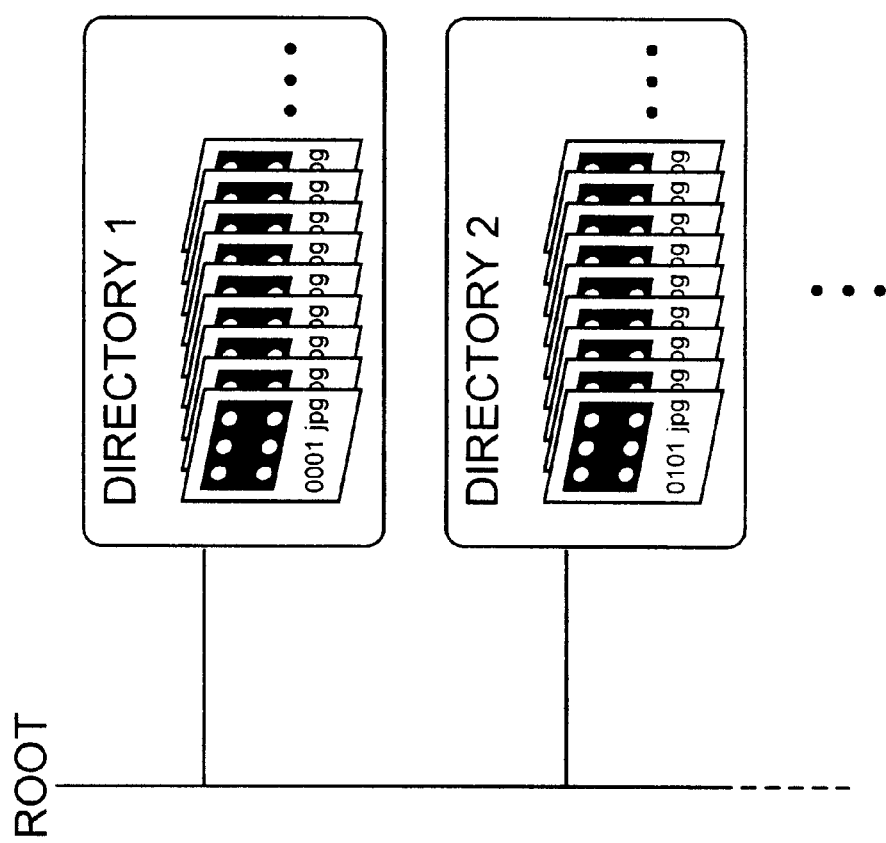
FIG. 7 is a diagram showing the still image management method in a digital still camera.
Figure 8:
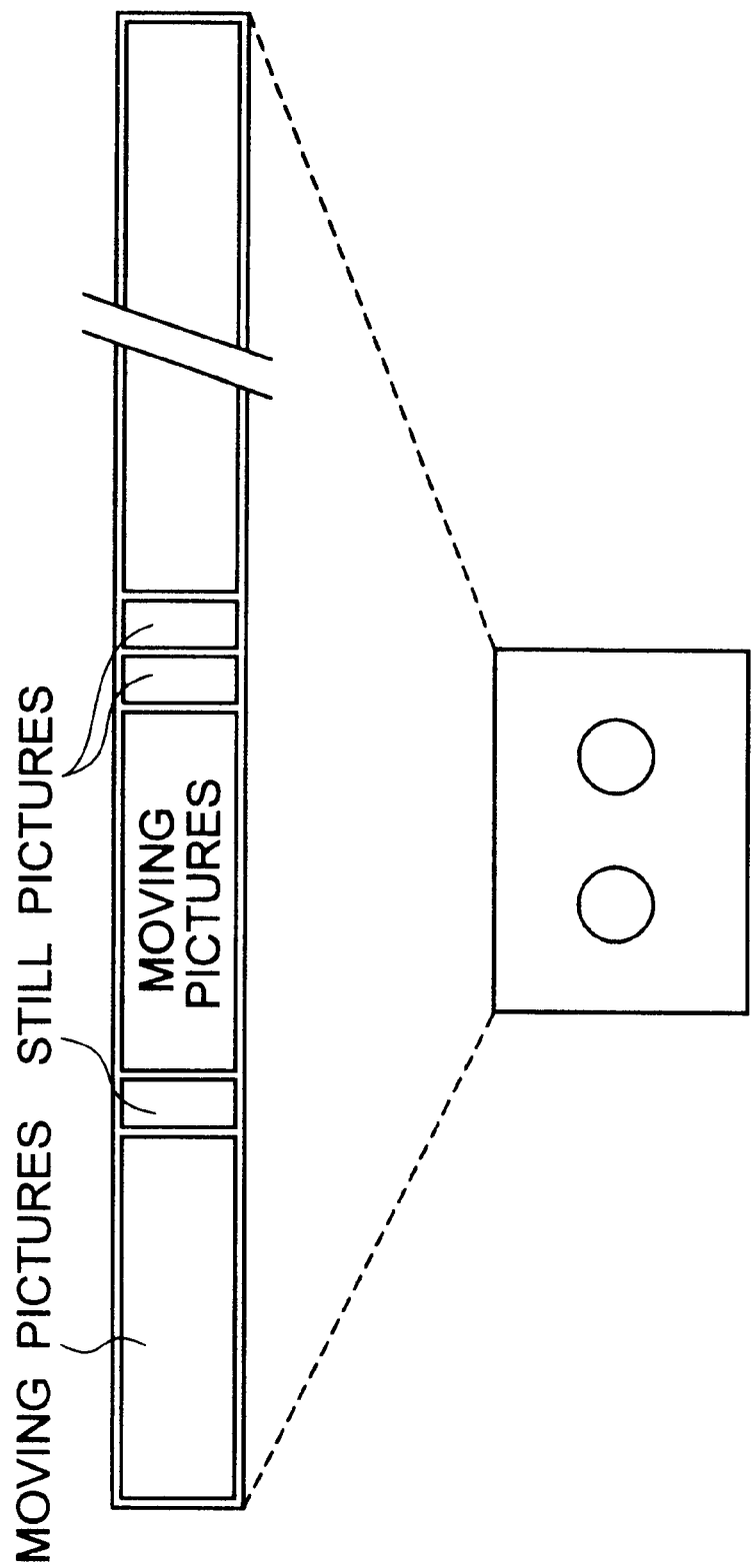
FIG. 8 is a diagram showing the recording status of video and still images of a digital VTR.
Figure 9:
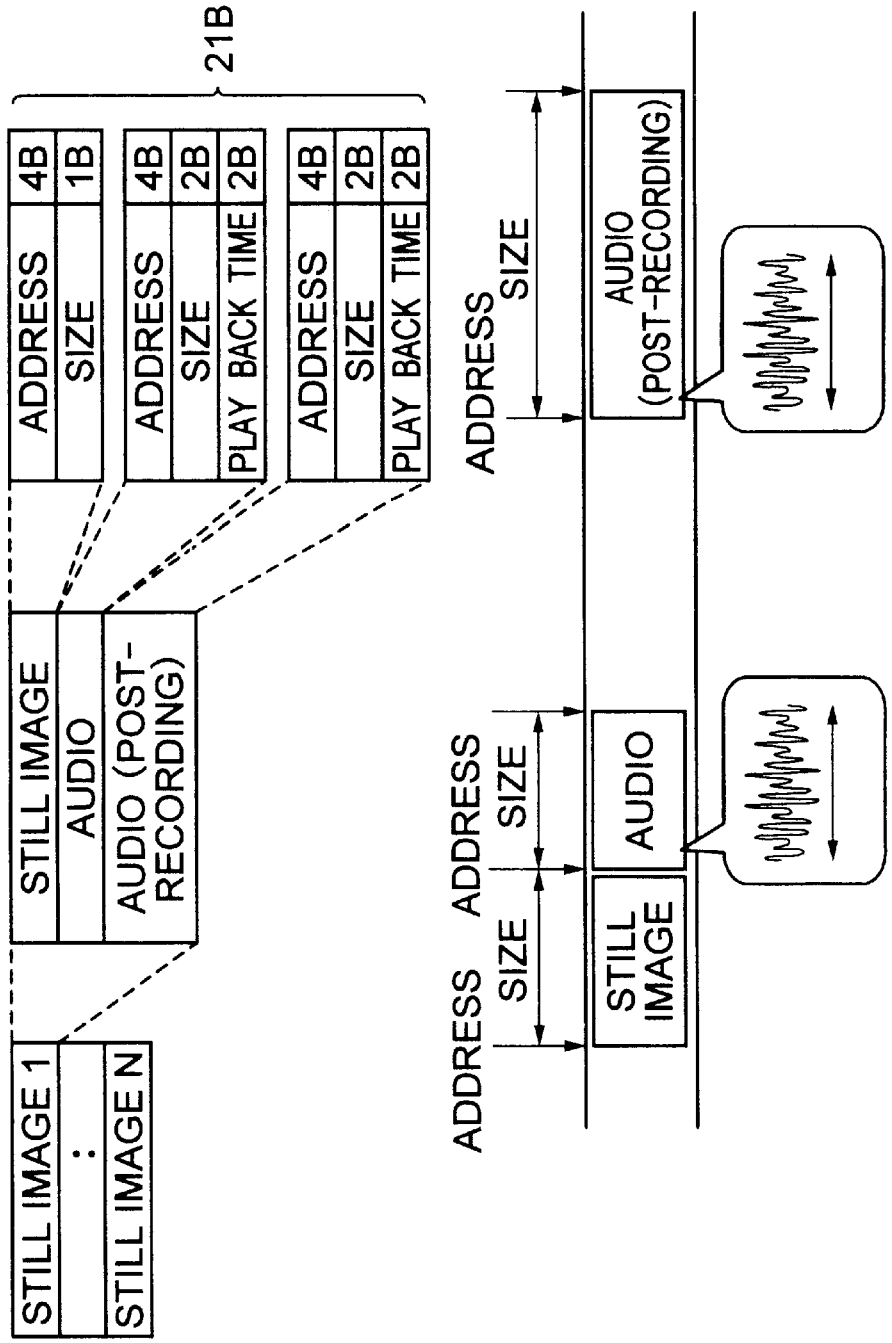
FIG. 9 is a diagram showing the configuration of still image management information.

As a modification of the management method described in FIG. 12 to FIG. 14, 4 bytes of the still image data address information (Address) may be added to the still image management information (VideoI) for each still image, composed of one byte of size information (Size) and one byte of pointer information (Ptr_to_AudioI) pointing to the audio management information, shown in FIG. 12. This means that, though the data size of the management information on one still image is increased to 6 bytes as compared with that of the above method, access to the still image data becomes easier. At this time, when there is no audio data to be played back in synchronization with the still image, the management information may be reduced to about 29% (6/21) of the management information data size (21 bytes for each still image) of the prior art shown in FIG. 9.

(Block Diagram of the DVD Recorder)

Figure 15:
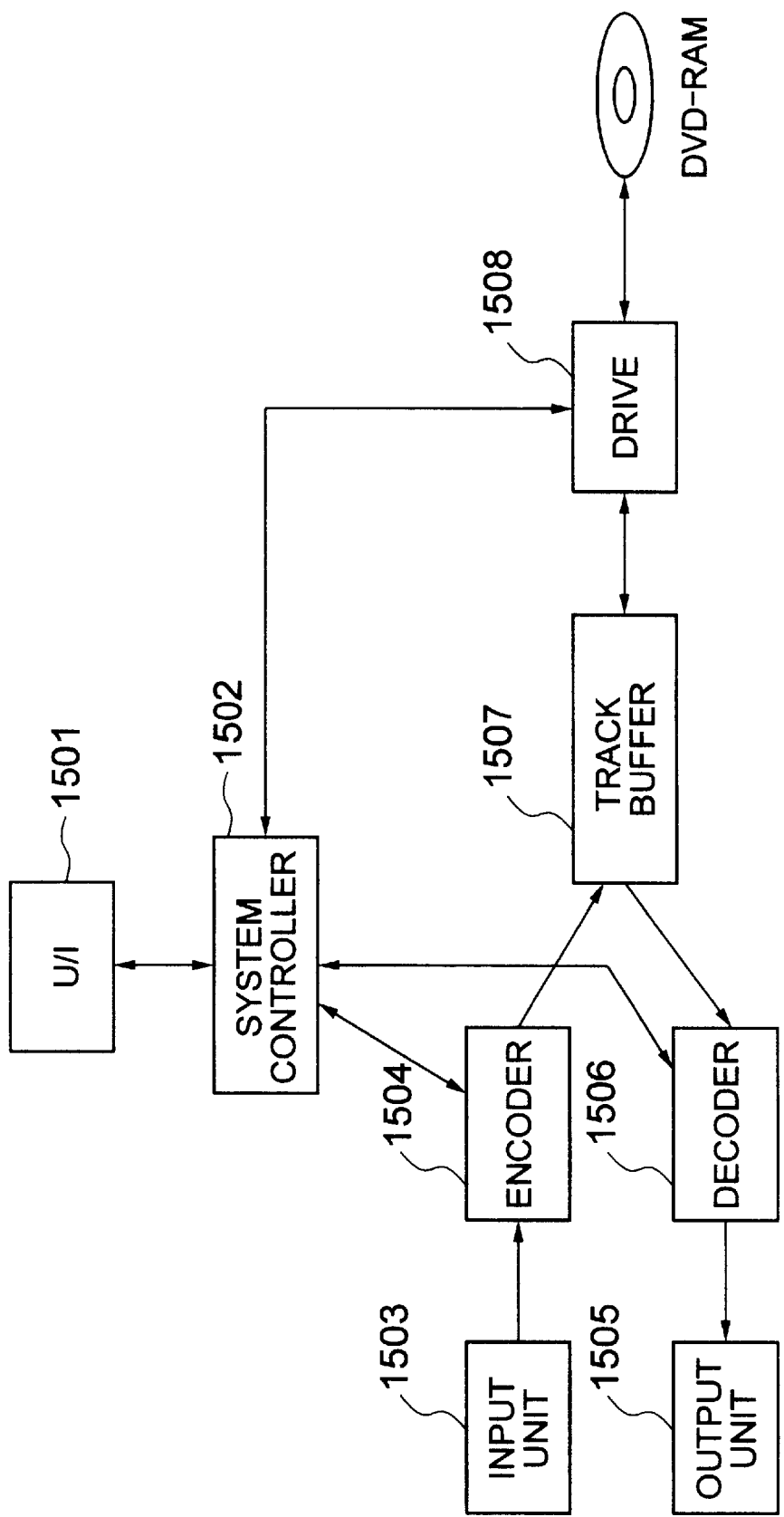
FIG. 15 is a block diagram of a DVD recorder/player.

FIG. 15 is a block diagram of the DVD recorder used in the embodiment of the present invention.

In the figure, the reference numeral 1501 is a user interface unit displaying information to, and receiving a request from, the user, 1502 is a system controller performing overall management and control, 1503 is an input unit consisting of a camera and a microphone, 1504 is an encoder consisting of a video encoder, an audio encoder, and a system encoder, 1505 is an output unit consisting of a monitor and a speaker, 1506 is a decoder consisting of a system decoder, an audio decoder, and a video decoder, 1507 is a track buffer, and 1508 is a drive. The system controller 1502 is a microcomputer or some other digital signal processor. The system controller 1502 controls access to the optical disk as directed by the program whose flowchart is shown in FIG. 14.

First, the recording operation of the DVD recorder is described by referring to FIG. 15.

First, the user interface unit 1501 receives a request from the user. The user interface unit 1501 sends the user request to the system controller 1502, and the system controller 1502 interprets the user request and makes a processing request to each module. When the user request is to take and record a still image, the system controller 1502 requests the encoder 1504 to encode one video frame and audio data.

The encoder 1504 video-encodes and system-encodes one video frame sent from the input unit 1503 and sends the result to the track buffer 1507.

Next, the encoder 1504 tells the system controller 1502 that the still image data has been created. The system controller 1502 records the still image data stored in the track buffer 1507 onto the DVD-RAM disk via the drive 1508.

After encoding the video data, the encoder 1504 immediately starts audio-encodes the audio data sent from the input unit 1503 and sequentially transfers the generated audio data to the track buffer 1507.

The encoder 1504 tells the system controller 1502 that audio encoding has been started. The system controller 1502 sequentially records the audio data stored in the track buffer 1507 onto the DVD-RAM disk via the drive 1508.

A stop request from the user is sent to the system controller 1502 via the user interface unit 1501. The system controller 1502 sends the recording stop instruction to the encoder 1504. The encoder 1504 ends encoding after the immediately-following audio frame is encoded, transfers all audio data to the track buffer 1507, and tells the system controller 1502 that encoding has finished. The system controller 1502 records all remaining audio data to the DVD-RAM disk via the drive 1508.

After finishing the above operation, the system controller 1502 creates the above-described VOBSIs and cellIs and records them on the DVD-RAM disk via the drive 1508. At this time, it is important that link information (Ptr_to_AudioI) pointing to the audio management information (AudioI) in the still image management information (VideoI) is generated so that it points to the audio management information (AudioI) of audio data recorded at the same time.

When the user continuously records still images and audio data as described above, one VOBS is created. The VOBS is a unit in the data structure and, at the same time, a block of still images taken continuously by the user at the same time. A plurality of VOBSs can be created within one recording medium.

Next, the playback operation of the DVD recorder is described with reference to FIG. 15.

First, the user interface unit 1501 receives a request from the user. The user interface unit 1501 sends the user request to the system controller 1502, and the system controller 1502 interprets the user request and makes a processing request to each module. When the user request is to play back a PGC pointing to a still image set (VOBS), the system controller 1502 reads the PGC information (PGCI) via the drive 1508 and, from VOBS_ID described in the cell information (CellI) of the PGCI that was read, reads the VOBS information (VOBSI).

Next, according to the flowchart described in FIG. 14, the system controller 1502 checks the address of the still image data to be played back, checks if there is audio data to be played back in synchronization with the still image data, and finds the audio data.

Next, the system controller 1502 asks the drive 1508 to read the still image data first and then audio data (if any) from the DVD-RAM disk and to store them into the drive 1508.

Then, the system controller 1502 issues a decode request to the decoder 1506. The decoder 1506 reads AV data from the track buffer 1507 and decodes it. The decoded data is displayed on the monitor, or output from the speaker, via the output unit 1505.

In this embodiment, an example of DVD-RAM is described. The present invention is not limited only to a DVD-RAM or an optical disk but applies to other media too. Other media include random access recording media such as a magneto-optical disk, magnetic disk, and semiconductor memory.

In the embodiment, still image data VOBs and audio data VOBs are recorded in an AV file separately from other VOBs. They may also be recorded in the AV file in which other VOBs are recorded. The present invention is not limited by the configuration of an AV file.

In the embodiment, the order of audio management information (AudioI) entries in the audio management information table (Audio_Table) matches the order in which data is recorded in the AV file. In essence, the order is not limited. However, when the order of audio management information (AudioI) entries do not match the order in which data is recorded in the AV file, the search for the audio management information (AudioI) is not narrowed down to one entry and therefore all audio management information (AudioI) must be searched.

In this embodiment, all still images and all audio data managed by a VOBSI are recorded in an area in the AV file beginning at VOBS_Start_Address and ending at VOBS_End_Address. However, audio data, especially audio data recorded through post-recording, need not be recorded in this range but may be recorded in any position within the AV file as long as it is not included in a recording area (from VOBS_Start_Address to VOBS_End_Address) managed by some other VOBS.

Figure 16:
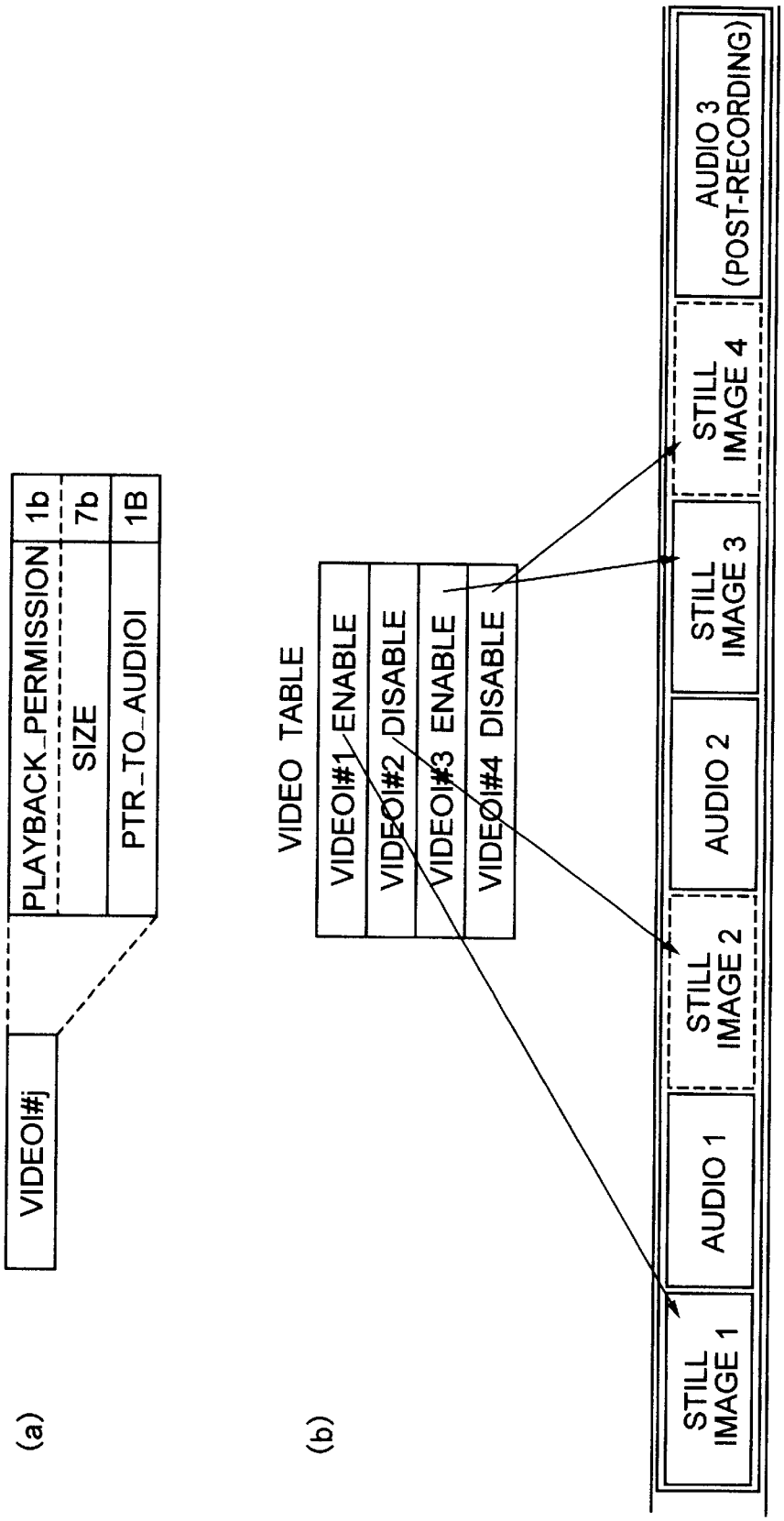
FIG. 16 is an diagram showing an example of a still image enable flag.

In addition, a one-bit playback identification flag (Playback_Permission), if provided in still image management information (VideoI) to indicate the playback enable/disable option as shown in FIG. 16, enables the user to specify a still image not to be played back, that is, a still image to be skipped. This ability allows the user to play back only the selected still images from a large number of still images that were taken.

In FIG. 12, an address is represented by 4 bytes. The address may be represented by 3 bytes because the maximum number of sectors (2048 bytes) on a 4.7 GB disk is 2,464,153 (=4.7×1024×1024×1024/2048) and therefore all sector addresses on the disk may be represented by at least 22 bits.

The embodiment of the present invention is an optical disk on which at least still image data is recorded, the optical disk comprising still image set management information (VOBSI) managing synthetically a plurality of still image data pieces as one still image set and a variable-size still image management information table (Video_Table) proportional to a number of still images managed by the still image set management information (VOBSI). When audio data to be played back in synchronization with the still images is recorded, the optical disk further comprises, a variable-size audio management information table (Audio_Table) proportional, in size, to the number of the audio data pieces to be played back in synchronization with the still images in the still image set. The still image management information table (Video_Table) comprises at least one still image management information (VideoI) entry composed of a still image data size and pointer information (Ptr_to_AudioI) pointing to the audio management information (AudioI) to be played back in synchronization with the still image.

As a result, the present invention compresses the management information on the still images and audio data, reducing them to a little larger than 10% of that used in the conventional configuration.

The audio management information table (Audio_Table) comprises at least one audio management information (AudioI) entry composed of an audio data address, an audio data size, an audio playback time, and, when post-recording is used, pointer information (Ptr_to_AudioI) having a link to other audio management information (AudioI). Therefore, the present invention allows the user to perform post-recording without losing the original audio management information.

For each still image in the still image set, a playback identification flag (Playback_Permission), which indicates whether or not the still image is to be displayed during playback, is provided in the still image management information (VideoI). Therefore, the present invention allows the user to specify that unnecessary still images be skipped during playback.

What is claimed is:

1. An optical disk for recording still image data (VOB) therein, having:

still image set management information (VOBSI) for managing one or more still images as (VOB) a still image set (VOBG), wherein said still image set management information (VOBSI) includes still image management information (VideoI) corresponding to the still image data to be managed;

said still image management information (VideoI) includes a data size of the still image and information (Prt_to_AudioI) indicating whether audio data to be played back in synchronization with said still image is recorded or not; and said optical disk enables a playback apparatus for still image data playback of only the still image data, or playback of the still image data with at least either one of original audio data and post-recording audio data, based on the information (Prt_to_AudioI).

2. An optical disk according to claim 1, wherein when the audio data to be played back in synchronization with said still image is recorded, said still image set management information (VOBSI) has audio management information (AudioI) including at least a data size and a playback time of said audio data.

3. An optical disk according to claim 2, wherein when an audio data is newly recorded by post-recording in said disk, said still image set management information (VOBSI) has pointer information for linking to the other audio management information in said still image set management information (VOBSI).

4. An optical disk according to claim 1, wherein said still image management information (VideoI) includes a playback identification flag for each still image for specifying whether or not the still image will be displayed during playback.

5. A method of recording still image set management information for managing one or more still images (VOB) as a still image set (VOBS) onto an optical disk, wherein said method comprises a step of recording still image management information (VideoI) having data size of the still image data and information (Prt_to_AudioI) indicating whether audio data to be played back in synchronization with said still image is recorded or not in said still image set management information (VOBSI) in the same order of recording corresponding still images (VOB).

6. A method according to claim 5, wherein when the audio data to be played back in synchronization with said still image is recorded, said still image set management information (VOBSI) has audio management information (AudioI) including at least a data size and a playback time of said audio data.

7. A method according to claim 6, wherein when an audio data is newly recorded by post-recording in said disk, said still image set management information (VOBSI) has pointer information for linking to the other audio management information in said still image set management information (VOBSI).

8. A method according to claim 5, wherein said still image management information (VideoI) includes a playback identification flag for each still image for specifying whether or not the still image will be displayed during playback.

9. A recording apparatus for recording one or more still image data (VOB) and still image set management information (VOBSI) for managing one or more still images (VOB) as a still image set (VOBS) onto an optical disk, wherein still image management information (VideoI) having information (Prt_to_AudioI) indicating whether audio data to be played back in synchronization with said still image is recorded or is not recorded in said still image set management information (VOBSI) in the same order of recording corresponding still images (VOB).

10. A method of playing back an optical disk wherein one or more still image data and still image set management information (VOBSI) for managing one or more still images (VOB) as a still image set are recorded, said method comprising the steps of:

reading out said still image set management information (VOBSI) from said optical disk;

reading out still image management information (VideoI) having information (Prt_to_AudioI) indicating whether audio data to be played back in synchronization with said still image is recorded or not;

specifying a recording position of the still image data corresponding to said still image set management information (VOBSI) based on a storing order and the size of the read out of said still image management information (VideoI) in said still image set management information (VOBSI); and playing back the still image data in said specified recording position.

11. A method according to claim 10, wherein when the audio data to be played back in synchronization with said still image is recorded, said still image set management information (VOBSI) has audio management information (AudioI) including at least a data size and a playback time of said audio data.

12. A method according to claim 11, wherein when an audio data is newly recorded by post-recording in said disk, said still image set management information (VOBSI) has pointer information for linking to the other audio management information in said still image set management information (VOBSI).

13. A method according to claim 10, wherein said still image management information (VideoI) includes a playback identification flag for each still image for specifying whether or not the still image will be displayed during playback.

14. An apparatus for playing back an optical disk wherein one or more still image data (VOB) and still image set management information for managing one or more still images (VOB) as a still image set (VOBS) are recorded, said apparatus comprising:

means for reading out said still image set management information (VOBSI) from said optical disk;

means for reading out still image management information (VideoI) having information (Prt_to_AudioI) indicating whether audio data to be played back in synchronization with said still image is recorded or not;

means for specifying a recording position of the still image data corresponding to said still image set management information (VOBSI) based on a storing order and the size of the read out said still image management information (VideoI) in said still image set management information (VOBSI); and means for playing back the still image data in said specified recording position.

* * * * *